United States Patent
Hayashida

(10) Patent No.: US 7,893,377 B2
(45) Date of Patent: Feb. 22, 2011

(54) METHOD FOR CONCENTRATING OXYGEN ISOTOPE

(75) Inventor: Shigeru Hayashida, Kofu (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 1171 days.

(21) Appl. No.: 10/547,425

(22) PCT Filed: Mar. 2, 2004

(86) PCT No.: PCT/JP2004/002568

§ 371 (c)(1), (2), (4) Date: Jun. 5, 2006

(87) PCT Pub. No.: WO2004/078325

PCT Pub. Date: Sep. 16, 2004

(65) Prior Publication Data

US 2006/0249366 A1    Nov. 9, 2006

(30) Foreign Application Priority Data

| Mar. 4, 2003 | (JP) | 2003-057439 |
| Jul. 24, 2003 | (JP) | 2003-200951 |
| Sep. 11, 2003 | (JP) | 2003-319729 |

(51) Int. Cl.
*B01D 5/00* (2006.01)

(52) U.S. Cl. .................. 204/157.2

(58) Field of Classification Search .............. 204/157.2
See application file for complete search history.

(56) References Cited

U.S. PATENT DOCUMENTS

| 3,309,300 A | 3/1967 | Grosse et al. ............... 204/176 |
| 3,400,024 A | 9/1968 | Platz ............................. 149/1 |
| 3,451,911 A * | 6/1969 | Schachner et al. .......... 205/634 |
| 3,937,956 A | 2/1976 | Lyon ........................... 250/290 |
| 4,029,558 A | 6/1977 | Marling ................. 204/158 R |
| 4,437,958 A | 3/1984 | Rockwood et al. .... 204/157.1 R |
| 6,321,565 B1 | 11/2001 | Kihara et al. ................. 62/643 |

(Continued)

FOREIGN PATENT DOCUMENTS

| EP | 0 489 916 | 6/1992 |
| EP | 1 604 729 A1 | 12/2005 |
| GB | 1473330 | 5/1977 |
| JP | 03-165817 | 7/1991 |

(Continued)

OTHER PUBLICATIONS

Chakraborty et al., "Oxygen Isotopic Fractionation During UV and Visible Light Photodissociation of Ozone", J. of Chem. Phys. (Feb. 1, 2003), vol. 118, No. 5, pp. 2164-2172.*

(Continued)

*Primary Examiner*—Edna Wong
(74) *Attorney, Agent, or Firm*—Nixon & Vanderhye P.C.

(57) ABSTRACT

A method of concentrating the stable oxygen isotopes of $^{17}O$ and $^{18}O$ by irradiating ozone with light, selectively dissociating an isotopologue of ozone containing an oxygen isotope in its molecule into oxygen, followed by dissociating the ozone and separating the formed oxygen from the non-dissociated ozone.

In the ozone photodissociation step, light is radiated onto a rare gas-ozone mixed gas containing ozone and at least one rare gas selected from krypton, xenon and radon is used to selectively dissociate ozone containing a specific oxygen isotope in its molecule into oxygen then the oxygen isotope is separated from non-dissociated ozone and rare gas to concentrate the oxygen isotope present in the separated oxygen.

6 Claims, 8 Drawing Sheets

U.S. PATENT DOCUMENTS

| | | | |
|---|---|---|---|
| 6,461,583 B1 * | 10/2002 | Hayashida et al. | 423/579 |
| 6,752,851 B2 | 6/2004 | Kawai et al. | 95/96 |
| 6,835,287 B1 | 12/2004 | Kihara et al. | 202/154 |
| 7,297,237 B2 | 11/2007 | Asano et al. | 203/5 |
| 7,393,447 B2 | 7/2008 | Kihara et al. | 205/628 |

FOREIGN PATENT DOCUMENTS

| | | |
|---|---|---|
| JP | 04-300633 | 10/1992 |
| JP | 07-148419 | 6/1995 |
| JP | 2004-105889 | 4/2004 |
| JP | 2004-261776 | 9/2004 |
| JP | 2005-040668 | 2/2005 |
| RU | 2 092 234 C1 | 10/1997 |

OTHER PUBLICATIONS

McGrath et al., "The Flash Photolysis of Ozone", Proc. Roy. Soc. A (Nov. 5, 1957), vol. 242, Plate 30, pp. 265-276.*

Kuze et al., Isotope-Selective Photodissociation of Ozone Molecules Induced by Infrared Laser Irradiation, Chem. Phys. Lett. (no month, 2008), vol. 455, pp. 156-158.*

Kuze et al, "Isotope-selective photodissociation of ozone molecules induced by infrared laser irradiation", Chemical Physical Letters, 455 (2008) 156-158.

International Search Report of PCT/JP2004/002568, mailed Jul. 20, 2004.

International Search Report for PCT/JP2006/304125 mailed May 2, 2006.

Li et al, "Ozone and Ozonesphere" published in Journal of Yunyang Teachers College in Aug. 2002.

Bouvier et al, "Spectroscopy and Predissociation of the $^3A_2$ Electronic State of Ozone $^{16}O_3$ and $^{18}O_3$ by High Resolution Fourier Transform Spectrometry", Spectrochemica Acta Part A, 57 (2001), p. 561-579.

Office Action (Decision on Grant) issued on Russian Appln. No. 2007135880/12 on Nov. 25, 2009 w/English translation.

Kaufman, F. and Kelso, J.R., "M Effect in the Gas-Phase Recombination of O with $O_2$," J. Chem. Phys, 1967 (46), pp. 4541-4543.

Streng, L.V. and Streng, A.G., "Solubility and Phase Diagram of the Liquid $O_2$-$CF_4$ System", J. Chem. Phys. 1963 (38), p. 1788.

* cited by examiner

METHOD FOR CONCENTRATING OXYGEN ISOTOPE

This application is the U.S. national phase of international application PCT/JP2004/002568, filed 2 Mar. 2004, which designated the U.S. and claims priority of JP 2003-057439, filed 4 Mar. 2003; JP 2003-200951, filed 24 Jul. 2003; JP 2003-319729, filed 11 Sep. 2003, the entire contents of each of which are hereby incorporated by reference.

BACKGROUND OF THE INVENTION

1. Field of the Invention

The present invention relates to a method for concentrating oxygen isotopes, and more particularly, to a method for selectively concentrating the stable oxygen isotopes, $^{17}O$ and/or $^{18}O$, which exist in extremely small natural abundance, by using an ozone photodissociation reaction or a peroxide photodissociation reaction.

2. Description of the Related Art

Since $^{17}O$ and $^{18}O$, which are oxygen isotopes used as tracers in the fields of chemistry and medicine, exist in extremely small natural abundance, it is necessary that they be concentrated. A known method for concentrating $^{18}O$ consists of obtaining a product that contains $^{18}O$ by selectively photodissociating a saturated chain ether that contains $^{18}O$ by irradiating it with laser light (refer to, for example, Japanese Examined Patent Application, Second Publication No. 6-102134). Other methods include a method for selectively concentrating $^{18}O$ by irradiating formaldehyde or carbon monoxide with laser light.

However, for reasons such as a low concentration rate, low utilization efficiency of the light that contributes to the reaction, low luminescence efficiency of the laser light and the necessity for post-processing for extracting the concentrated chemical species, the methods of the prior art have not been established industrially. Although the concentration of oxygen isotopes using a distillation procedure has also been proposed, problems are encountered in order to increase the degree of concentration, such as increased size of the device and the start-up time of the device being extremely long.

Therefore, the object of the present invention is to provide a method for concentrating oxygen isotopes that are capable of concentrating a oxygen isotope either in the state of the stable oxygen isotopes of $^{17}O$ or $^{18}O$, or in a substance such as water having a simple molecular structure.

SUMMARY OF THE INVENTION

In order to achieve the aforementioned object, the oxygen isotope concentration method of the present invention comprises (a) an ozone photodissociation step, in which ozone molecules containing oxygen isotopes, $^{17}O$ and/or $^{18}O$, are selectively photodissociated to oxygen molecules; thereby generating a mixture of the oxygen molecules and non-dissociated ozone molecules, followed by (b) an oxygen isotope concentration step, in which the oxygen molecules are separated from the mixture, thereby concentrating the oxygen isotope. More specifically, the present invention comprises (A) an ozone formation step, in which ozone is produced from raw material oxygen, thereby forming a mixture of the produced ozone and the raw material oxygen, (B) an ozone separation step, in which the produced ozone is separated from the mixture, (C) an ozone photodissociation step, in which ozone molecules containing oxygen isotopes, $^{17}O$ and/or $^{18}O$, are selectively photodissociated to oxygen molecules; thereby generating a mixture of the oxygen molecules and non-dissociated ozone molecules, and (D) an oxygen isotope concentration step, in which the oxygen molecules are separated from the mixture obtained in the step (C), thereby concentrating the oxygen isotope.

Different oxygen isotopes can also be concentrated in two stages by carrying out (E) a second ozone photodissociation step, in which the non-dissociated ozone molecules containing an oxygen isotope that is different from one separated in the step (D) are photodissociated to oxygen molecules, thereby generating a mixture of the oxygen molecules and non-dissociated ozone molecules, and (F) a second oxygen isotope concentration step, in which the oxygen molecules are separated from the mixture obtained in the step (E), thereby concentrating the oxygen isotope that is different from one separated in the step (D).

The oxygen isotope concentration method of the present invention may also contain an oxygen isotope concentration step in which ozone is irradiated with light after adding at least one type of krypton, xenon or radon rare gas in the photodissociation step (a) or (B), thereby generating a mixture of the oxygen molecules, non-dissociated ozone molecules, and the rare gas; and the oxygen molecules obtained in the ozone photodissociation step is separated from the mixture.

In the oxygen isotope concentration method of the present invention, the oxygen isotope concentration step (b) or (D) may be distillation in which at least one type of helium, neon or argon rare gas is added for the oxygen isotope concentration step.

In the present invention, at least one type of rare gas selected from helium, neon, argon or krypton is added to the raw material oxygen in the step (A).

In the present invention, (G) an ozone abatement step, in which the non-dissociated ozone molecules remaining after the step (D) are decomposed into oxygen molecules, thereby forming a mixture of the oxygen molecules and the rare gas, and (H) a rare gas separation step, in which the rare gas is separated from the mixture obtained in the step (G), are carried out, wherein the rare gas separated in the step (H) is recycled for use in the step (A).

In the present invention, (E') a second ozone photodissociation step, in which molecules of an isotopologue of ozone that are different from those of the isotopologue of ozone dissociated in the step (C) are photodissociated to oxygen molecules, thereby generating a mixture of the oxygen molecules and non-dissociated ozone molecules, and (F') a second oxygen isotope concentration step, in which the oxygen molecules obtained in the step (E') are separated from the mixture generated in the step (E'), thereby concentrating the second oxygen isotope in the separated oxygen molecules.

In the oxygen isotope concentration method of the present invention, the light used in the ozone photodissociation step (a) or (C) is preferably either light within a range of 700-1000 nm, or light within a range of 450-850 nm. In particular, the wavelength of the light used in the ozone photodissociation step is more preferably within the range of 991.965 to 992.457 nm. It is also preferable to adjust the absorption wavelength of ozone by applying an electric field in the ozone photodissociation step (a) or (C). It is also preferable to carry out the ozone photodissociation step (a) or (C) at low temperature and low pressure.

There are 18 types of the aforementioned ozone isotopologues, consisting of $^{16}O^{16}O^{16}O$, $^{16}O^{16}O^{17}O$, $^{16}O^{17}O^{16}O$, $^{16}O^{16}O^{18}O$, $^{16}O^{18}O^{16}O$, $^{16}O^{17}O^{17}O$, $^{17}O^{16}O^{17}O$, $^{16}O^{17}O^{18}O$, $^{17}O^{16}O^{18}O$, $^{16}O^{18}O^{17}O$, $^{17}O^{17}O^{17}O$, $^{16}O^{18}O^{18}O$, $^{18}O^{16}O^{18}O$, $^{17}O^{17}O^{18}O$, $^{17}O^{18}O^{17}O$, $^{17}O^{18}O^{18}O$, $^{18}O^{17}O^{18}O$ and $^{18}O^{18}O^{18}O$.

In the present invention, the oxygen molecules containing a desired oxygen isotope, $^{17}O$ or $^{18}O$ can be photodissociated by irradiating ozone molecules containing a mixture of these various types of isotopologues with light.

For example, when the isotopomer $^{16}O^{16}O^{17}O$ is irradiated with light, three molecules of oxygen are generated from two molecules of ozone according to the reaction formulas shown below.

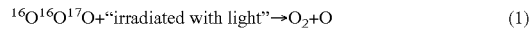

$$^{16}O^{16}O^{17}O + \text{"irradiated with light"} \rightarrow O_2 + O \quad (1)$$

$$O_3 + O \rightarrow 2O_2 \quad (2)$$

In this reaction, the $^{17}O$ that composed the ozone that was photodissociated in reaction formula (1) is either contained in the formed "$O_2$" or is in the form of "O". Since this "O" immediately reacts with other ozone to form two molecules of oxygen as shown in reaction formula (2), this means that the $^{17}O$ is present in one of the three molecules of oxygen formed in reaction formulas (1) and (2). Although there is the possibility of $^{17}O$ or $^{18}O$ also being contained in the ozone that reacts in reaction formula (2), the probability is extremely low such that the amount can be ignored.

The bond dissociation energy of ozone is 1.05 eV, and ozone breaks down during absorption of light having a wavelength of 1.18 μm or less. This light absorption by ozone is known to take place in the bands indicated below.

Wulf band 700-1000 nm (1.2-1.8 eV) Near infrared band
Chappius band 450-850 nm (1.5-2.8 eV) Visible band
Huggins band 300-360 nm (3.4-4.1 eV) Ultraviolet band
Hartly band 200-300 nm (4.1-6.2 eV) Ultraviolet band Even in these bands, in the vicinity of a wavelength of 1000 nm (wave number: 10000 cm$^{-1}$) of the Wulf band, a sharp absorption peak as shown in FIG. 1 is observed according to the literature (*Journal of Chemical Physics*, Vol. 108, No. 13, p. 5449-5475). FIG. 1 shows the optical absorbance for $^{16}O_3$ ($^{16}O^{16}O^{16}O$) and $^{18}O_3$($^{18}O^{18}O^{18}O$). The maximum peak of $^{16}O_3$ can be seen to be at a wave number of 10081 cm$^{-1}$ (wavelength: 991.965 nm), while the maximum peak of $^{18}O_3$ can be seen to be at a wave number of 10076 cm$^{-1}$ (wavelength: 992.457 nm). Thus, the wavelength at which an isotopologue of ozone containing $^{17}O$ or $^{18}O$ can be efficiently dissociated is located between these two, and it can be seen that the desired ozone can be selectively dissociated by selecting a wavelength within that range.

Although other absorption peaks can be used, in consideration of the dissociation efficiency of the ozone, the aforementioned range is optimal. In particular, there is also the advantage of such light in the near infrared or visible band being easier to handle in comparison with the case of using light of the ultraviolet band. If ultraviolet light of a high energy level is used, in addition to the target ozone isotopologue, other ozone isotopologues may also end up being dissociated, thereby lowering the concentration efficiency of the oxygen isotope.

In the case of poor selective dissociation efficiency due to the light source having shifted slightly from the desired ozone dissociation wavelength, since the absorption wavelength of ozone can be shifted using the Stark effect by applying an electric field to the ozone when irradiating with light, the absorption wavelength of the ozone can be made to precisely match the wavelength of the light source.

Examples of light sources that can be used to obtain light of this wavelength include spectral light of sunlight as well as colored laser light capable of optical pumping with an InGaAsP semiconductor laser or light emitting diode, AlGaInP semiconductor laser or light emitting diode, GaAsSb semiconductor laser or light emitting diode, CdZnTe semiconductor laser or light emitting diode, CdZnSe semiconductor laser or light emitting diode, mercury lamp, YAG laser, Ar ion laser or Kr ion laser.

When irradiating ozone with light, light is preferably radiated at a low pressure of, for example, 13 kPa (100 Torr) or less in order to lengthen the mean free path of the ozone molecules and suppress molecular collisions as much as possible. As a result, increases in absorption width of the light caused by molecular collisions can be avoided. In order to suppress spontaneous dissociation of ozone, it is preferable to cool not only during irradiation of the ozone with light, but the entire system as well, to a low temperature within the range of, for example, 100-250 K. As a result, in addition to making the absorption peaks sharper, the formation of oxygen by spontaneous dissociation can be suppressed, thereby making it possible to improve the concentration rate of oxygen containing oxygen isotopes.

Ozone can be formed easily by silent discharge of oxygen serving as the material with an ozonizer, or by irradiating with ultraviolet light from a mercury lamp and so forth. Although oxygen of high purity that contains as few impurities such as argon and nitrogen as possible is preferably used for the raw material oxygen, if these impurities can be adequately separated when separating the ozone and oxygen, then industrial oxygen having a purity of about 99.5% can also be used for the raw material oxygen.

Oxygen consisting of $^{17}O$ or $^{18}O$ concentrated with the concentration method of the present invention as well as oxygen consisting of $^{17}O$ or $^{18}O$ concentrated with other methods can be used for the raw material oxygen.

Separation of ozone and oxygen or separation of oxygen, ozone and rare gas can be easily carried out by low-temperature distillation utilizing the difference in boiling points between them, or by low-temperature adsorption utilizing their differences in adsorption to an adsorbent such as silica gel.

As shown, for example, in the system diagram of FIG. 2, the optimum device configuration for carrying out the present invention is provided with an ozone formation unit 11 that forms ozone from raw material oxygen GO, an ozone separation unit 12 that separates ozone OZ formed with the ozone generation unit and raw material oxygen, an ozone photodissociation unit 13 that radiates light L of a specific wavelength onto the ozone separated by ozone separation unit 12 and selectively degrades ozone containing a specific oxygen isotope in its molecule into oxygen, and an oxygen separation unit 14 that separates the oxygen OC formed by degrading ozone in ozone photodissociation unit 13 and non-dissociated ozone OZ to concentrate the desired oxygen isotope in the oxygen.

The device configuration for carrying out the present invention can also be provided with a second ozone photodissociation unit 15, which radiates light L onto ozone OZ separated by oxygen separation unit 14 and selectively degrades ozone that contains in its molecule a different oxygen isotope from the ozone dissociated by the ozone photodissociation unit 13 into oxygen, and a second oxygen separation unit 16, which separates oxygen OC2 formed by the dissociation of ozone in the second ozone photodissociation unit 15 and non-dissociated OZ2 to concentrate an oxygen isotope in the oxygen.

The amount of raw material oxygen consumed can be reduced by providing a line by which oxygen GO separated by ozone separation unit 12 is recycled and fed into ozone formation unit 11. Ozone photodissociation unit 13 is preferably provided with a cooling unit and a pressure reduction unit.

In the case of concentrating oxygen isotopes using ozone, although it is preferable to use ozone having as high a purity as possible in consideration of the radiation efficiency of the light and the concentration efficiency, the use of highly pure ozone may result in spontaneous dissociation due to catalysis with metal surfaces having catalytic action. If oxygen not containing the desired oxygen isotope is formed in large amounts due to spontaneous dissociation of ozone, this oxygen can cause a considerable decrease in the concentration rate in the aforementioned oxygen isotope concentration step.

As another method of concentrating oxygen isotopes of the present invention, ozone concentration can be lowered by adding a suitable amount of a rare gas to the ozone in order to prevent in advance any decreases in the concentration rate of oxygen isotopes caused by spontaneous dissociation of ozone.

Since rare gases (helium, neon, argon, krypton, xenon and radon) have hardly any effect on the photochemical reactions of ozone in the ozone photodissociation step, a specific ozone can be still be selectively dissociated even if the ozone is diluted with these rare gases. In addition, handling of the ozone can be made easier as compared with highly pure ozone by diluting it with a rare gas.

Mixing of ozone and rare gas can be carried out with an arbitrary device of each step, and a rare gas suitable for each step should be added in a suitable amount. At this time, rare gases that solidify at low temperatures, rare gases that condense at locations where they should be gaseous, and rare gases that vaporize at locations where they should be a liquid are unsuitable, and it is necessary to select rare gases according to the operating pressure and operating temperature. In the case of using low-temperature distillation separation for the oxygen isotope concentration step and ozone separation step, although it is necessary to ensure that the ozone does not reach a high concentration by containing a suitable amount of rare gas in the liquid phase on the ozone side, in order to obtain the rising gas and falling liquid necessary for the distillation procedure, a rare gas that is concentrated on the gas phase side may be used in combination. In the case of collecting and reusing the rare gas, it is preferable to select a rare gas that separates easily from the oxygen in the rare gas separation step. However, xenon and radon are not preferable for use in the ozone formation step since they form unstable compounds by reacting with oxygen that is caused by silent discharge with an ozonizer or irradiation with ultraviolet light from a mercury lamp and so forth.

The oxygen isotope concentration device for carrying out the present invention can be provided with an ozone photodissociation unit, which radiates light onto a rare gas-ozone mixed gas containing ozone and at least one type of rare gas selected from krypton, xenon and radon, and selectively degrades ozone containing a specific oxygen isotope in its molecule into oxygen, and an oxygen isotope concentration unit, which separates the oxygen separated from ozone in the ozone photodissociation unit from non-dissociated ozone to concentrate the oxygen isotope present in the separated oxygen.

Still another oxygen isotope concentration method of the present invention comprises photodissociation of peroxide with semiconductor laser light, and thereby increasing the concentration of an oxygen isotope in a photoreaction product.

Examples of the peroxide include at least one type of organic peroxide such as hydroperoxides such as HOOH and $(CH_3)_3COOH$, (di)alkyl peroxides such as $CH_3OOCH_3$, $C_2H_5OOC_2H_5$ and $(CH_3)_3OO(CH_3)_3$, peroxyacids including peracids such as HCOOOH and $CH_3OOOH$, (di)acyl peroxides such as $CH_3OOOCOCH_3$ and

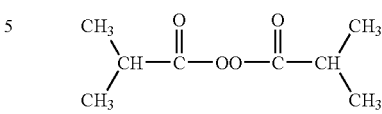

peroxyesters such as $CH_3OOOC(CH_3)_3$, $(CH_3)_2CHCOOOC(CH_3)_3$ and $(CH_3)_3C—COOOC(CH_3)_3$, peroxycarbonates such as $(CH_3)_3COOCOOCH(CH_3)_2$, peroxydicarbonates such as

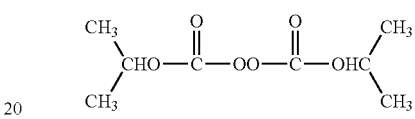

diperoxycarbonates such as i-PrO—COOOCOO-i-Pr(i-Pr: isopropyl group), peroxalates, cyclic peroxides, ozonides and endoperoxides such as

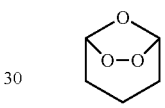

or at least one type of nitric ester such as methyl nitrate, and ethyl nitrate, or nitrous ester such as methyl nitrite or ethyl nitrite.

The aforementioned peroxides may be diluted with at least one type of solvent selected from carbon tetrachloride, acetone, acetic acid, hexane, toluene and chlorofluorocarbons, or organic substances having a double bond, and the aforementioned dissociation is predissociation.

As a more concrete example of this method, the method further comprises (I) a vaporization step, in which a solution prepared by diluting peroxide having a O—H bond, O—O bond, C—O bond, or C=O bond with a solvent is vaporized under reduced pressure, and then fed into a photoreaction cell;

(II) a photodissociation step, in which the peroxide in the photoreaction cell is irradiated with semiconductor laser light having photon energy enough to dissociate the peroxide and wavelength of which corresponding to one of the absorption spectra of a O—H bond, O—O bond, C—O bond or C=O bond, thereby photodissociating the peroxide; and (III) a purification step of the photoreaction product from the step (II), thereby concentrating $^{17}O$ or $^{18}O$ in one type of molecular species.

BRIEF DESCRIPTION OF THE REFERENCE SYMBOLS

Figure 1:
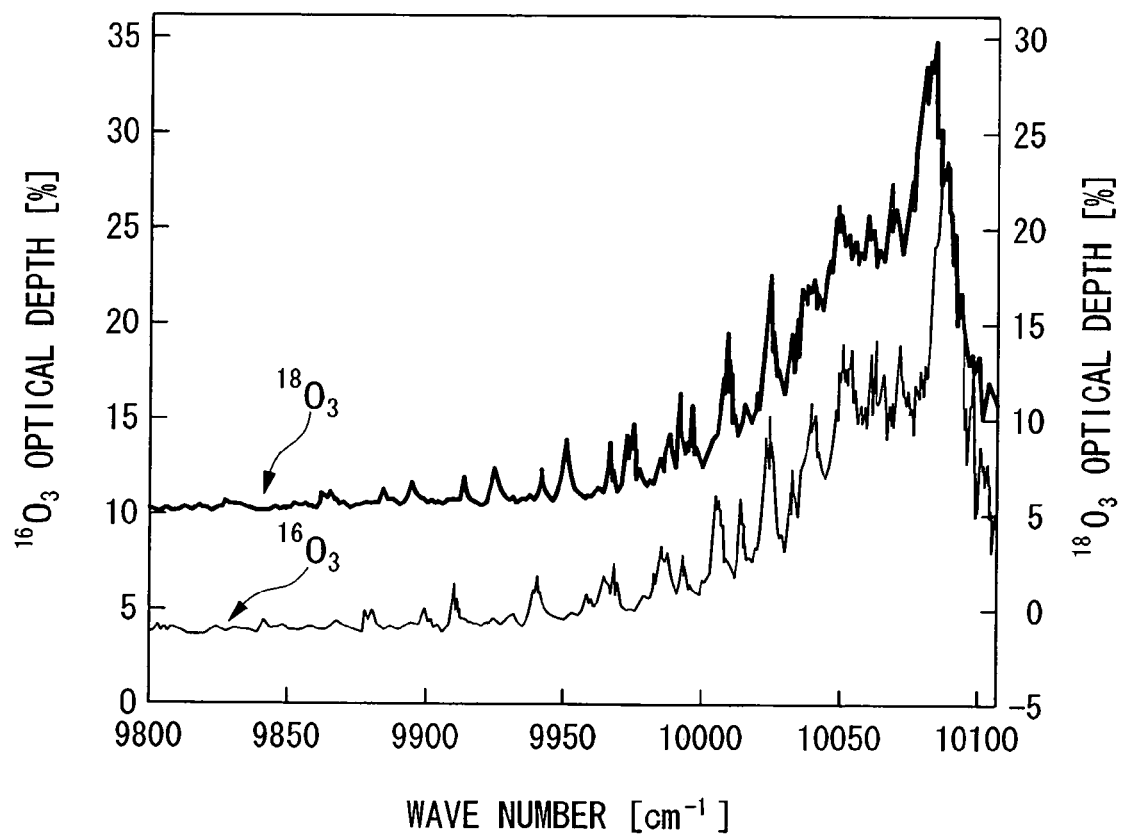
FIG. 1 is a drawing showing the absorption spectrum of ozone.
Figure 2:
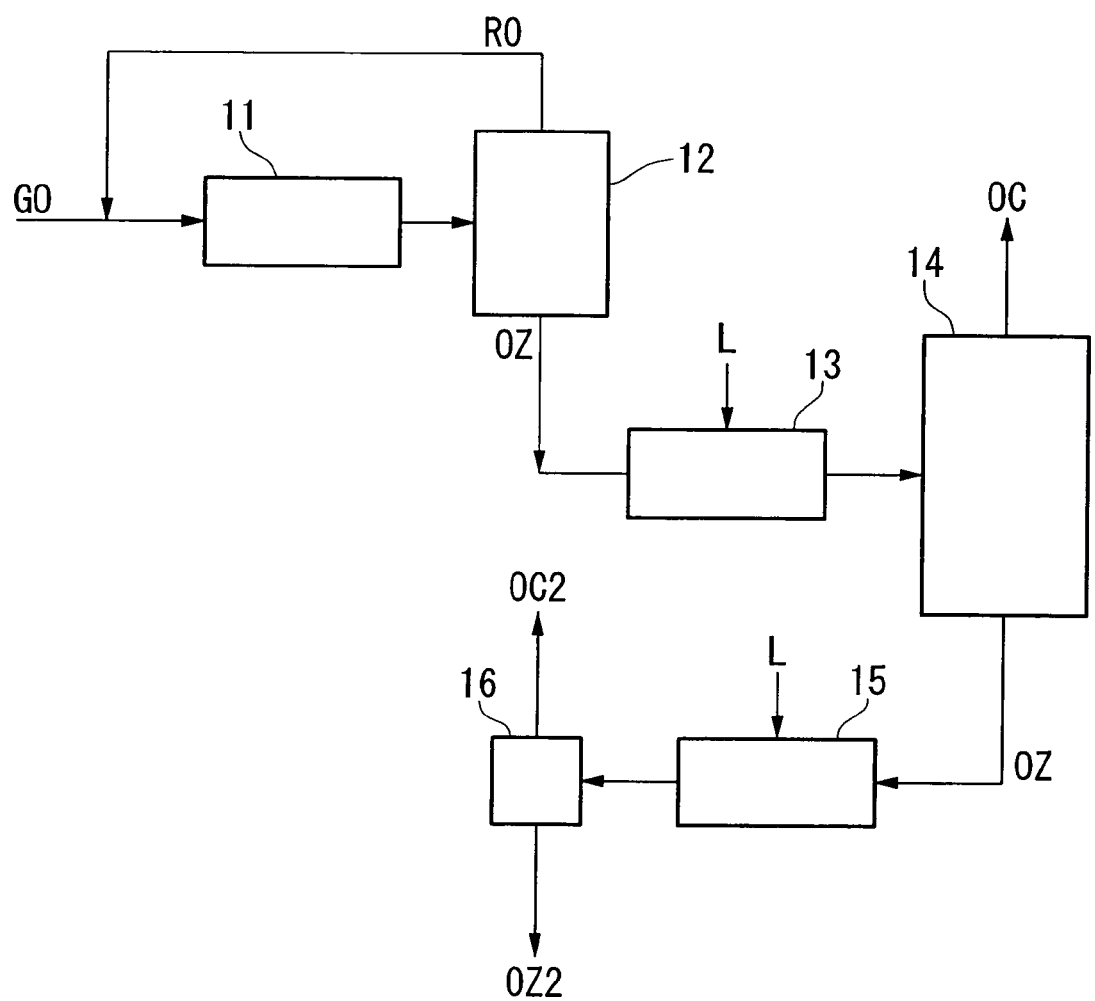
FIG. 2 is a system diagram showing an example of the configuration of a device for carrying out the method of the present invention.

11: Ozone formation unit
12: Ozone separation unit
13: Ozone photodissociation unit
14: Oxygen separation unit
15: Second ozone photodissociation unit
16: Second oxygen separation unit
21: Ozonizer
22: First distillation tower
23: Condenser
24: Reboiler
25: Heat exchanger
26: Buffer tank
27: Blower
31: Light source
32: Photoreaction cell
33: Second distillation tower
34: Condenser
35: Reboiler
36: Heat exchanger
51-56: Lines
57: Valve
58: Line
59: Valve
61-64: Lines
111: Ozone formation unit
112: Ozone separation unit
113: Ozone photodissociation unit
114: Oxygen isotope concentration unit
115-116: Lines
117-119: Rare gas feed lines
121: Second ozone photodissociation unit
122: Second oxygen isotope concentration unit
123: Ozone decomposition unit
124: Rare gas recovery unit
125-126: Lines
131: Line
211: Purifier
212: Photoreaction cell
213: Cold trap
214: Vacuum pump
215: Distiller
221-228: Lines

DETAILED DESCRIPTION OF THE PREFERRED EMBODIMENTS

Figure 3:
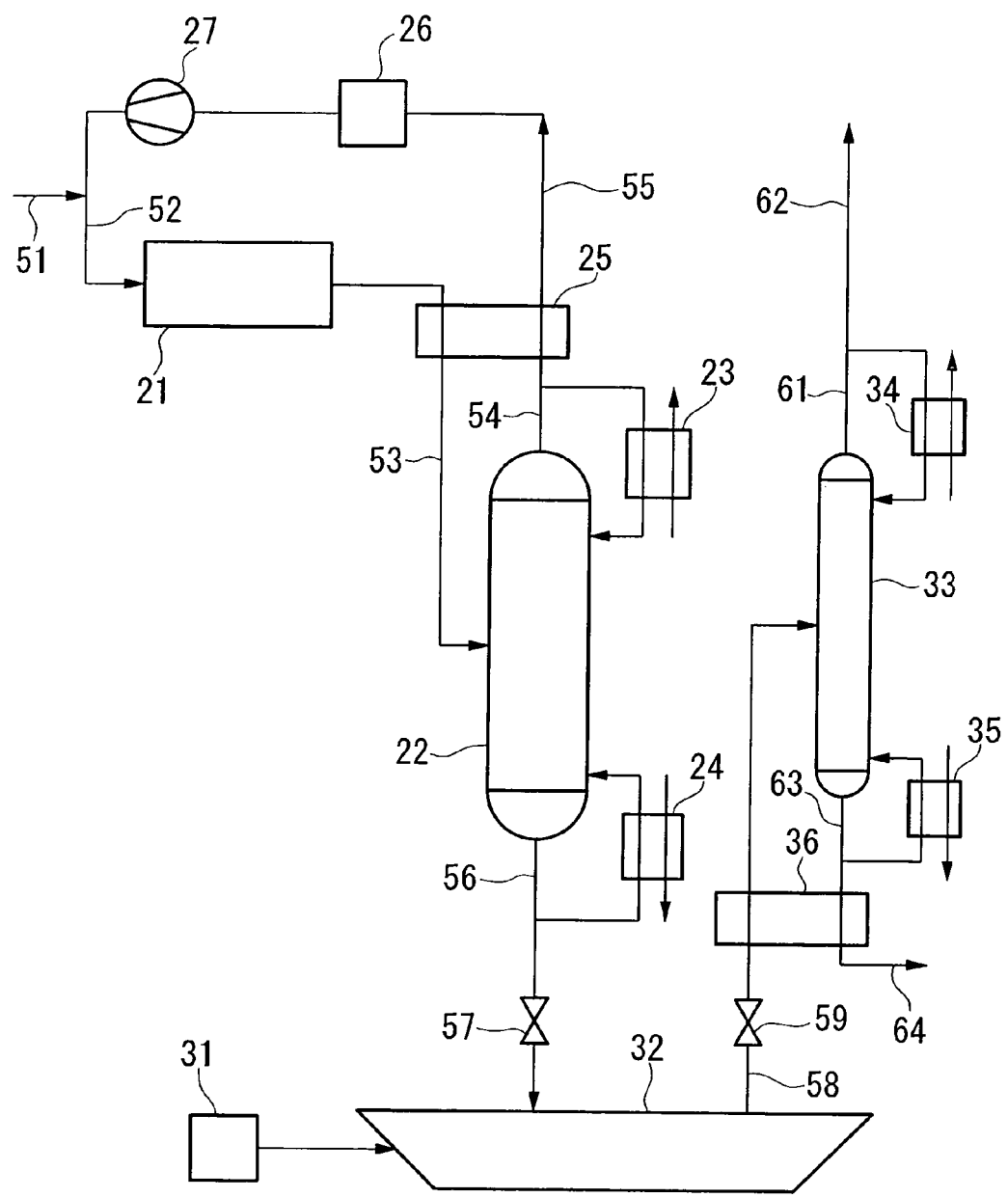
FIG. 3 is a system diagram showing a first embodiment of an oxygen isotope concentration device of the present invention.

FIG. 3 is a system diagram showing a first embodiment of the oxygen isotope concentration device of the present invention. This concentration device is provided an ozonizer 21 for obtaining ozone from raw material oxygen, a first distillation tower 22 that separates the ozone formed with this ozonizer 21 and the raw material oxygen, a condenser 23 for imparting the cold required by the low-temperature distillation procedure in this first distillation tower 22, a reboiler 24 for generating rising gas in the first distillation tower, a heat exchanger 25 for recovering the cold of the first distillation tower effluent gas in the first distillation tower feed gas, a buffer tank for temporarily storing the first distillation tower effluent gas, and a blower 27 for circulating and feeding first distillation tower effluent gas in buffer tank 26 to ozonizer 21.

The equipment for concentrating oxygen containing a specific isotope from the ozone is provided with a photoreaction cell 32 for separating a specific ozone isotopologue into oxygen by light radiated from light source 31, a second distillation tower 33 that separates the oxygen formed in photoreaction cell 32 from non-dissociated ozone to concentrate the oxygen isotope in the oxygen, a condenser 34 for imparting the cold required by the low-temperature distillation procedure in second distillation tower 33, a reboiler 35 for generating rising gas in the second distillation tower, and a heat exchanger 36 for recovering the cold of the second distillation tower effluent gas in the second distillation tower feed gas.

A portion of the raw material oxygen, which has been supplied from line 51 and has merged with circulating oxygen from line 52, is ozonized by silent discharge in ozonizer 21 to become an ozone-oxygen mixed gas, and after this gas is cooled in heat exchanger 25, it is fed to the intermediate stage of first distillation tower 22 from line 53. This ozone-oxygen mixed gas is distilled by a refluxing liquid formed with condenser 23 located above the first distillation tower and a rising gas formed in reboiler 24 located beneath the first distillation tower, and the liquefied ozone of the oxygen gas in the upper portion of first distillation tower 22 respectively separates in the bottom of first distillation tower 22. A portion of the oxygen that has been discharged to line 54 from the first distillation tower branches to condenser 23, while the remainder is temporarily stored in buffer tank 26 after passing through line 55, after which it is compressed with blower 27 and circulated and fed into ozonizer 21 from line 52.

A portion of the ozone that has been discharged from the bottom of first distillation tower 22 to line 56 branches to reboiler 24, while the remainder is fed to photoreaction cell 32 in a gaseous state after passing through valve 57. The specific isotopologue present in this ozone is dissociated into oxygen by light radiated from light source 31, and the ozone-oxygen mixed gas composed of dissociated oxygen and non-dissociated ozone is led out from line 58 through valve 59. Inside photoreaction cell 32, in order to carry out dissociation of a specific isotopologue of ozone efficiently in a stable state, together with reducing the pressure to 13 kPa or less, the inside of the photoreaction cell is cooled to within a range of 100-250 K. Pressure and temperature may be suitably set according to the dissociation status of the ozone, and at least the area between photoreaction cell 32 and valves 57 and 59 on both sides should be maintained at a predetermined pressure and predetermined temperature within ranges that do not cause the ozone to liquefy or solidify.

The ozone-oxygen mixed gas of line 58 is fed into the intermediate stage of second distillation tower 33 after being cooled with heat exchanger 36, and similar to the aforementioned first distillation tower 22, is distilled by a refluxing liquid from condenser 34 and a rising gas from reboiler 35, causing ozone to separate in the lower portion of the tower and oxygen gas containing a specific oxygen isotope to concentrate in the upper portion of the tower. The concentrated oxygen gas containing a specific isotope is discharged from the upper portion of second distillation tower 33 into line 61, and after a portion of the gas has branched to condenser 34, is recovered in the form of a product from line 62. After a portion of the ozone that has been discharged from the bottom of second distillation tower 33 into line 63 has branched to reboiler 35, the remainder is removed to line 64 after passing through heat exchanger 36.

The ozone of line 64 is normally discharged after being dissociated into oxygen by an ozone photodissociation unit using a catalyst and so forth. The ozone of this line 64 can also be fed into a second photoreaction cell (not shown) serving as a second photodissociation unit provided separately from the aforementioned photoreaction cell 32, an isotopologue can be dissociated that differs from that dissociated in photoreaction cell 32, and the isotope-containing oxygen formed by this dissociation can be separated from the ozone and concentrated by using a second oxygen separation unit in the form of a distillation tower and so forth.

Although the operating conditions of each distillation tower are arbitrary, since the concentration of the desired isotope-containing oxygen gas decreases if oxygen enters the photoreaction cell, it is preferable obtain ozone in a state that is as free of oxygen as possible. Nitrogen or argon at a suitable temperature can be used for the cooling source supplied to the condenser and the heating source supplied to reboiler. Nitrogen or argon at a suitable temperature can also be used for cooling the photoreaction cell. Reduction of pressure inside the system that contains the photoreaction cell can be carried out by installing a vacuum pump in a suitable line downstream from the photoreaction cell or by reducing the pressure by liquefaction using liquid nitrogen and so forth. A material that does not exhibit reactivity or catalytic action with ozone should be selected for the materials of the equipment, and normally glass or fluororesin ((polytetrafluoroethylene) and so forth is used preferably.

The calculated values of process flow rates and so forth in each line when producing 10 kg (as $H_2O$) annually by concentrating $^{17}O$ using a concentration device having the configuration shown in FIG. 3 are shown in Table 1. Oxygen gas in which $^{17}O$ and $^{18}O$ have been concentrated by distillation is used for the raw material oxygen. $^{16}O^{17}O^{18}O$ was selected for the isotopologue used for the purpose of degrading in the photoreaction cell. Laser light having a wavelength of 992 nm was used for the light for degrading this isotopologue. The laser output was set to 1.0 W, and the absorption cross-sectional area was set to $3.0 \times 10^{-23}$ $cm^2$. The pressure in the photoreaction cell was 13 kPa (100 Torr), and the temperature was 200 K. The optical path length was 40 m, the retention time was 100 seconds, the light utilization rate was 0.0019, the yield of the target isotopologue was 0.90, and the amount of non-selective dissociation of other isotopologues generated simultaneous to dissociation of the target isotopologue was 3.3 with respect to a value of 1 for the target isotopologue. The concentration rate of $^{17}O$ at this time was 10.8. The amount of power consumed by the ozonizer was 3.0 kW.

TABLE 1

| | | | Line Number | | | | | | | |
|---|---|---|---|---|---|---|---|---|---|---|
| | | | 51 | 52 | 53 | 55 | 56 | 58 | 64 | 62 |
| | | | Flow Rate | | | | | | | |
| No. | | mol/s | 5.50E−04 | 3.85E−03 | 3.87E−03 | 3.30E−03 | 3.87E−03 | 3.69E−04 | 3.61E−04 | 8.42E−06 |
| | Mol Fraction | | | | | | | | | |
| 1 | $O_2$ | [−] | 1.000 | 1.000 | 0.900 | 1.000 | 0.000 | 0.023 | 0.000 | 1.000 |
| 2 | $O_3$ | [−] | 0.000 | 0.000 | 0.100 | 0.000 | 1.000 | 0.977 | 1.000 | 0.000 |
| | Total Atom Fraction | | 1.000 | 1.000 | 1.000 | 1.000 | 1.000 | 1.000 | 1.000 | 1.000 |
| 1 | $^{16}O$ | [−] | 0.430 | 0.430 | 0.430 | 0.430 | 0.430 | 0.430 | 0.4304 | 0.4026 |
| 2 | $^{17}O$ | [−] | 0.010 | 0.010 | 0.010 | 0.010 | 0.010 | 0.010 | 0.0086 | 0.1015 |
| 3 | $^{18}O$ | [−] | 0.560 | 0.560 | 0.560 | 0.560 | 0.560 | 0.560 | 0.5610 | 0.4959 |
| | Total Mol Fraction | | 1.000 | 1.000 | 1.000 | 1.000 | 1.000 | 1.000 | 1.0000 | 1.0000 |
| 1 | $^{16}O^{16}O$ | [−] | 0.1849 | 0.1849 | 0.1664 | 0.1849 | | 0.0037 | | 0.1621 |
| 2 | $^{16}O^{17}O$ | [−] | 0.0088 | 0.0088 | 0.0077 | 0.0088 | | 0.0019 | | 0.0817 |
| 3 | $^{16}O^{18}O$ | [−] | 0.4816 | 0.4816 | 0.4334 | 0.4816 | | 0.0091 | | 0.3993 |
| 4 | $^{17}O^{17}O$ | [−] | 0.0001 | 0.0001 | 0.0001 | 0.0001 | | 0.0002 | | 0.0103 |
| 5 | $^{17}O^{18}O$ | [−] | 0.0112 | 0.0112 | 0.0101 | 0.0112 | | 0.0023 | | 0.1007 |
| 6 | $^{18}O^{18}O$ | [−] | 0.3136 | 0.3136 | 0.2822 | 0.3136 | | 0.0056 | | 0.2459 |
| 7 | $^{16}O^{16}O^{16}O$ | [−] | | | 0.0080 | | 0.0795 | 0.0780 | 0.799 | |
| 8 | $^{16}O^{16}O^{17}O$ | [−] | | | 0.0004 | | 0.0037 | 0.0036 | 0.0037 | |
| 9 | $^{16}O^{17}O^{16}O$ | [−] | | | 0.0002 | | 0.0018 | 0.0018 | 0.0019 | |
| 10 | $^{16}O^{16}O^{18}O$ | [−] | | | 0.0207 | | 0.2071 | 0.2033 | 0.2080 | |
| 11 | $^{16}O^{18}O^{16}O$ | [−] | | | 0.0104 | | 0.1035 | 0.1016 | 0.1040 | |
| 12 | $^{16}O^{17}O^{17}O$ | [−] | | | 0.0000 | | 0.0001 | 0.0001 | 0.0001 | |
| 13 | $^{17}O^{16}O^{17}O$ | [−] | | | 0.0000 | | 0.0000 | 0.0000 | 0.0000 | |
| 14 | $^{16}O^{17}O^{18}O$ | [−] | | | 0.0005 | | 0.0048 | 0.0004 | 0.0004 | |
| 15 | $^{17}O^{16}O^{18}O$ | [−] | | | 0.0005 | | 0.0048 | 0.0047 | 0.0048 | |
| 16 | $^{16}O^{18}O^{17}O$ | [−] | | | 0.0005 | | 0.0048 | 0.0047 | 0.0048 | |
| 17 | $^{17}O^{17}O^{17}O$ | [−] | | | 0.0000 | | 0.0000 | 0.0000 | 0.0000 | |
| 18 | $^{16}O^{18}O^{18}O$ | [−] | | | 0.0270 | | 0.2697 | 0.2647 | 0.2709 | |

TABLE 1-continued

| | | | \multicolumn{8}{c}{Line Number} |
|---|---|---|---|---|---|---|---|---|---|---|
| | | | 51 | 52 | 53 | 55 | 56 | 58 | 64 | 62 |
| | | | \multicolumn{8}{c}{Flow Rate} |
| No. | | mol/s | 5.50E−04 | 3.85E−03 | 3.87E−03 | 3.30E−03 | 3.87E−03 | 3.69E−04 | 3.61E−04 | 8.42E−06 |
| 19 | $^{18}O^{16}O^{18}O$ | [−] | | | 0.0135 | | 0.1348 | 0.1324 | 0.1354 | |
| 20 | $^{17}O^{17}O^{18}O$ | [−] | | | 0.0000 | | 0.0001 | 0.0001 | 0.0001 | |
| 21 | $^{17}O^{18}O^{17}O$ | [−] | | | 0.0000 | | 0.0001 | 0.0001 | 0.0001 | |
| 22 | $^{17}O^{18}O^{18}O$ | [−] | | | 0.0006 | | 0.0063 | 0.0062 | 0.0063 | |
| 23 | $^{18}O^{17}O^{18}O$ | [−] | | | 0.0003 | | 0.0031 | 0.0031 | 0.0031 | |
| 24 | $^{18}O^{18}O^{18}O$ | [−] | | | 0.0176 | | 0.1756 | 0.1724 | 0.1764 | |
| | Total | | 1.00000 | 1.00000 | 1.00000 | 1.00000 | 1.00000 | 1.00000 | 1.00000 | 1.00000 |

Next, the calculated values of process flow rates and so forth in each line in the case of producing 10 kg (as $H_2O$) annually using high-purity oxygen for the raw material oxygen are shown in Table 2 (Japanese Patent Application No. 2003-57439, Table 2). $^{16}O^{16}O^{17}O$ was selected for the target isotopologue. Laser light having a wavelength of 922 nm was used as the light for degrading this isotopologue. The laser output was set to 2.2 W, and the absorption cross-sectional area was set to $3.0 \times 10^{-23}$ cm$^2$. The pressure in the photoreaction cell was 13 kPa (100 Torr), and the temperature was 150 K. The optical path length was 40 m, the retention time was 100 seconds, the light utilization rate was 0.0003, the yield of the target isotopologue was 0.90, and the amount of non-selective dissociation of other isotopologues generated simultaneous to dissociation of the target isotopologue was 10 with respect to a value of 1 for the target isotopologue. The concentration rate of $^{17}O$ at this time was 85.4. The amount of power consumed by the ozonizer was 6.7 kW.

TABLE 2

| | | | \multicolumn{8}{c}{Line Number} |
|---|---|---|---|---|---|---|---|---|---|---|
| | | | 51 | 52 | 53 | 55 | 56 | 58 | 64 | 62 |
| | | | \multicolumn{8}{c}{Flow Rate} |
| No. | | mol/s | 1.22E−03 | 8.54E−03 | 8.13E−03 | 7.32E−03 | 8.13E−04 | 8.16E−04 | 8.07E−04 | 8.89E−06 |
| | Mol Fraction | | | | | | | | | |
| 1 | $O_2$ | [−] | 1.000 | 1.000 | 0.900 | 1.000 | 0.000 | 0.011 | 0.000 | 1.000 |
| 2 | $O_3$ | [−] | 0.000 | 0.000 | 0.100 | 0.000 | 1.000 | 0.989 | 1.000 | 0.000 |
| | Total | | 1.000 | 1.000 | 1.000 | 1.000 | 1.000 | 1.000 | 1.000 | 1.000 |
| | Atom Fraction | | | | | | | | | |
| 1 | $^{16}O$ | [−] | 0.99759 | 0.99759 | 0.99759 | 0.99759 | 0.99759 | 0.099759 | 0.99781 | 0.98751 |
| 2 | $^{17}O$ | [−] | 0.00037 | 0.00037 | 0.00037 | 0.00037 | 0.00037 | 0.00037 | 0.00015 | 0.03084 |
| 3 | $^{18}O$ | [−] | 0.00204 | 0.00204 | 0.00204 | 0.00204 | 0.00204 | 0.00204 | 0.00204 | 0.00185 |
| | Total Mol Fraction | | 1.00000 | 1.00000 | 1.00000 | 1.00000 | 1.00000 | 1.00000 | 1.00000 | 1.00000 |
| 1 | $^{16}O^{16}O$ | [−] | 0.99519 | 0.99519 | 0.89567 | 0.99519 | | 0.01020 | | 0.93607 |
| 2 | $^{16}O^{17}O$ | [−] | 0.00074 | 0.00074 | 0.00066 | 0.00074 | | 0.00065 | | 0.05929 |
| 3 | $^{16}O^{18}O$ | [−] | 0.00407 | 0.00407 | 0.00368 | 0.00407 | | 0.00004 | | 0.00359 |
| 4 | $^{17}O^{17}O$ | [−] | 0.00000 | 0.00000 | 0.00000 | 0.00000 | | 0.00001 | | 0.00094 |
| 5 | $^{17}O^{18}O$ | [−] | 0.00000 | 0.00000 | 0.00000 | 0.00000 | | 0.00000 | | 0.00011 |
| 6 | $^{18}O^{18}O$ | [−] | 0.00000 | 0.00000 | 0.00000 | 0.00000 | | 0.00000 | | 0.00000 |
| 7 | $^{16}O^{16}O^{16}O$ | [−] | | | 0.09928 | | 0.99279 | 0.98263 | 0.99345 | |
| 8 | $^{16}O^{16}O^{17}O$ | [−] | | | 0.00007 | | 0.00074 | 0.00007 | 0.00007 | |
| 9 | $^{16}O^{17}O^{16}O$ | [−] | | | 0.00004 | | 0.00037 | 0.00036 | 0.00037 | |
| 10 | $^{16}O^{16}O^{18}O$ | [−] | | | 0.00041 | | 0.00406 | 0.00402 | 0.00406 | |
| 11 | $^{16}O^{18}O^{16}O$ | [−] | | | 0.00020 | | 0.00203 | 0.00201 | 0.00203 | |
| 12 | $^{16}O^{17}O^{17}O$ | [−] | | | 0.00000 | | 0.00000 | 0.00000 | 0.00000 | |
| 13 | $^{17}O^{16}O^{17}O$ | [−] | | | 0.00000 | | 0.00000 | 0.00000 | 0.00000 | |
| 14 | $^{16}O^{17}O^{18}O$ | [−] | | | 0.00000 | | 0.00000 | 0.00000 | 0.00000 | |
| 15 | $^{17}O^{16}O^{18}O$ | [−] | | | 0.00000 | | 0.00000 | 0.00000 | 0.00000 | |
| 16 | $^{16}O^{18}O^{17}O$ | [−] | | | 0.00000 | | 0.00000 | 0.00000 | 0.00000 | |
| 17 | $^{17}O^{17}O^{17}O$ | [−] | | | 0.00000 | | 0.00000 | 0.00000 | 0.00000 | |
| 18 | $^{16}O^{18}O^{18}O$ | [−] | | | 0.00000 | | 0.00001 | 0.00001 | 0.00001 | |
| 19 | $^{18}O^{16}O^{18}O$ | [−] | | | 0.00000 | | 0.00000 | 0.00000 | 0.00000 | |

TABLE 2-continued

|   |   |   | \multicolumn{8}{c}{Line Number} |
| --- | --- | --- | --- | --- | --- | --- | --- | --- | --- | --- |
|   |   |   | 51 | 52 | 53 | 55 | 56 | 58 | 64 | 62 |
|   |   |   | \multicolumn{8}{c}{Flow Rate} |
| No. |   | mol/s | 1.22E−03 | 8.54E−03 | 8.13E−03 | 7.32E−03 | 8.13E−04 | 8.16E−04 | 8.07E−04 | 8.89E−06 |
| 20 | $^{17}O^{17}O^{18}O$ | [−] |   |   | 0.00000 |   | 0.00000 | 0.00000 | 0.00000 |   |
| 21 | $^{17}O^{18}O^{17}O$ | [−] |   |   | 0.00000 |   | 0.00000 | 0.00000 | 0.00000 |   |
| 22 | $^{17}O^{18}O^{18}O$ | [−] |   |   | 0.00000 |   | 0.00000 | 0.00000 | 0.00000 |   |
| 23 | $^{18}O^{17}O^{18}O$ | [−] |   |   | 0.00000 |   | 0.00000 | 0.00000 | 0.00000 |   |
| 24 | $^{18}O^{18}O^{18}O$ | [−] |   |   | 0.00000 |   | 0.00000 | 0.00000 | 0.00000 |   |
| Total |   |   | 1.00000 | 1.00000 | 1.00000 | 1.00000 | 1.00000 | 1.00000 | 1.00000 | 1.00000 |

Figure 4:
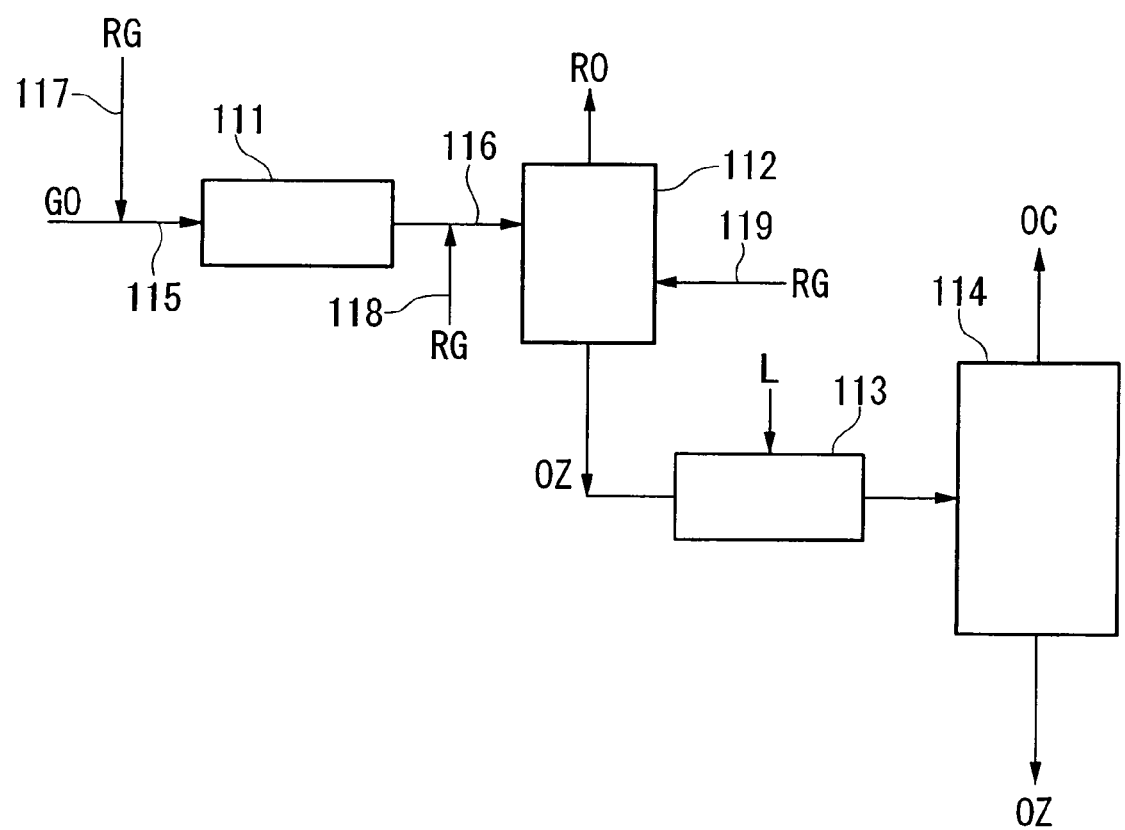
FIG. 4 is a system diagram showing a second embodiment of an oxygen isotope concentration device of the present invention.

FIG. 4 is a system diagram showing a second embodiment of an oxygen isotope concentration device. It shows an example of the configuration of a device provided with equipment for obtaining a rare gas-ozone mixed gas in a stage prior to the concentration device.

This concentration device, together with being provided with an ozone formation unit 111 that forms ozone from raw material oxygen GO, an ozone separation unit 112 that separates raw material oxygen containing ozone formed in said ozone formation unit 111 into ozone OZ and raw material oxygen RO, an ozone photodissociation unit 113 that selectively degrades ozone containing a specific oxygen isotope in its molecule into oxygen by irradiating the ozone OZ separated in said ozone separation unit 112 with light L of a specific wavelength, and an oxygen isotope concentration unit 114 that separates oxygen OC formed by the dissociation of ozone in said ozone photodissociation unit 113 from non-dissociated ozone OZ to concentrate a desired oxygen isotope in said oxygen, is also provided with a line 115 that feeds raw material oxygen into ozone formation unit 111, a line 116 that feeds ozone-containing oxygen formed in ozone formation unit 111 into ozone separation unit 112, or rare gas feed lines 117, 118 and 119 for feeding at least one type of rare gas selected from helium, neon, argon, krypton, xenon and radon to at least one suitable location of ozone separation unit 112 that concentrates ozone for use as a rare gas RG for dilution of ozone.

In rare gas feed line 117 among the aforementioned three rare gas feed lines 117, 118 and 119, a rare gas other than xenon and radon, for which there is the risk of oxidation or disintegration in ozone formation unit 111 (ozone formation step), is mixed alone or as a plurality of types and added to the raw material oxygen. In rare gas feed line 118, it is preferable that a rare gas be added that can be supplied to ozone photodissociation unit 113 together with ozone separated in ozone separation unit 112 (ozone separation step), namely a rare gas that is concentrated on the ozone side in the distillation separation step and low-temperature adsorption step.

Helium, neon or argon may also be added in consideration of the ease of operation of ozone separation unit 112. Since rare gas feed line 119 is for feeding a rare gas for obtaining the rare gas-ozone mixed gas supplied to ozone photodissociation unit 113, a rare gas that is concentrated on the ozone side in ozone separation unit 112 (at least one type consisting of krypton, xenon and radon) is fed by this line.

In this manner, by carrying out an ozone photodissociation step in which a rare gas-ozone mixed gas having a low ozone concentration is supplied to ozone photodissociation unit 113 and irradiated with light of a specific wavelength to selectively degrade an isotopologue of the ozone that contains a specific oxygen isotope in its molecule into oxygen by photodissociation, loss of ozone by spontaneous dissociation and dissociation of ozone by collision with formed oxygen can be suppressed, thereby making it possible to efficiently obtain oxygen containing a specific oxygen isotope.

In the oxygen isotope concentration unit 114 (oxygen isotope concentration step), since the aforementioned rare gases such as krypton, xenon and radon are concentrated on the ozone side in the same manner as ozone separation unit 112 when oxygen separated from ozone in ozone photodissociation unit 113 is separated from non-dissociated ozone, there is hardly any concentration of these rare gases on the oxygen side, thereby allowing the obtaining of oxygen containing a specific oxygen isotope at a high concentration.

A device may also be composed with only ozone photodissociation unit 113 and oxygen isotope concentration unit 114 without providing ozone formation unit 111 and ozone separation unit 112 by producing ozone premixed with at least one type of rare gas consisting of krypton, xenon and radon, and feeding this rare gas-ozone mixed gas into ozone photodissociation unit 113.

Figure 5:
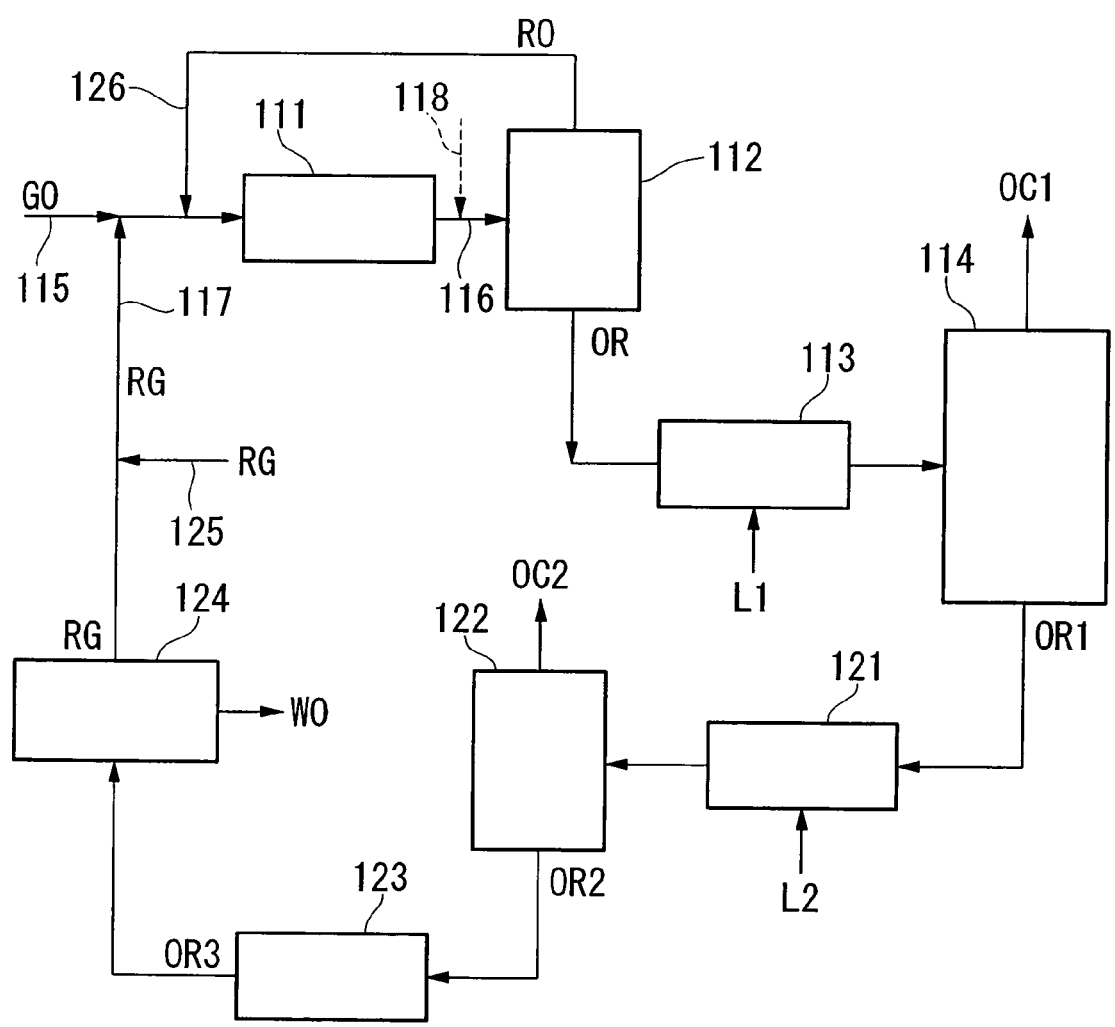
FIG. 5 is a system diagram showing a third embodiment of an oxygen isotope concentration device of the present invention.

FIG. 5 is a system diagram showing a third embodiment of a concentration device of the present invention. In the following explanation, the same reference symbols are used to indicate those constituents that are the same as those in the concentration device shown in the previously described second embodiment, and their detailed explanations are omitted.

This oxygen isotope concentration device is provided with an ozone formation unit 111, which performs silent discharge or radiation with a mercury lamp and so forth on a rare gas-raw material oxygen mixed gas in the form of a mixture of raw material oxygen GO fed from line 115, krypton RG circulated and fed from rare gas feed line 117, and circulating raw material oxygen RO circulated and fed from line 126, an ozone separation unit 112, which separates the rare gas-ozone- raw material oxygen mixed gas fed from said ozone formation unit 111 into line 116 into raw material oxygen RO that circulates to line 126 and rare gas-ozone mixed gas OR supplied to an ozone photodissociation unit 113, ozone photodissociation unit 113, which selectively degrades a specific isotopologue of ozone into oxygen by irradiating the rare gas-ozone mixed gas OR separated in said ozone separation unit 112 with light L of a specific wavelength, an oxygen isotope concentration unit 114, which separates oxygen OC1 formed by dissociation of ozone in said ozone photodissociation unit 113 from rare gas-ozone mixed gas OR1 composed of non-dissociated ozone and rare gas to concentrate the aforementioned oxygen isotope present in the separated oxygen OC1, a second ozone photodissociation unit 121, which selectively degrades an isotopologue different from the isotopologue of ozone used in the aforementioned ozone photodissociation unit 113 into oxygen by irradiating the rare gas-ozone mixed gas OR1 separated in said oxygen isotope concentration unit 114 with light L2 of a different wavelength than the light L1 used in the aforementioned ozone photodissociation unit 113, a second oxygen isotope concentration unit 122, which separates oxygen OC2 formed by dissociation of ozone in said second ozone photodissociation unit 121 from rare gas-ozone mixed gas OR2 composed of non-dissociated ozone and rare gas to concentrate a specific oxygen isotope in the aforementioned oxygen OC2, an ozone decomposition unit 123 for decomposing the ozone contained in rare gas-ozone mixed gas OR2 separated in said second oxygen isotope concentration unit 122 by degrading into oxygen, a rare gas recovery unit, which separates the rare gas-oxygen mixed gas OR3 of oxygen and rare gas fed from said ozone decomposition unit 123 into oxygen WO and rare gas RG to recover the separated rare gas in the aforementioned rare gas feed line 117, a line 125 for replenishing rare gas to rare gas feed line 117, and a line 126 that circulates and feeds circulating raw material oxygen RO separated in the aforementioned ozone separation unit 112 to the aforementioned ozone formation unit 111.

It is preferable to use a distillation tower that separates oxygen and rare gas-ozone mixed gas by a low-temperature distillation separation step for the aforementioned ozone separation unit 112, oxygen isotope concentration unit 114 and second oxygen isotope concentration unit 122. Although the operating conditions of each distillation tower are arbitrary, the ozone side should preferably contain as little oxygen as possible. In addition, nitrogen, argon or oxygen at a suitable temperature can be used for the cold source supplied to the condenser and heating source supplied to the reboiler.

A photoreaction cell provided with a specific light source can be used for ozone photodissociation unit 113 and second ozone photodissociation unit 121, and nitrogen, argon or oxygen at a suitable temperature can be used for the cold source when cooling the photoreaction cell. When reducing the pressure inside the system that contains the photoreaction cell, this can be carried out by installing a vacuum pump in a suitable line downstream from the photoreaction cell or by reducing the pressure by liquefaction using liquid nitrogen and so forth.

Heat dissociation or catalytic dissociation can be used in ozone decomposition unit 123, which dissociates the entire amount of residual ozone. A distillation tower using low-temperature distillation or an adsorption separation device using an adsorbent can be used for rare gas recovery unit 124. A material that is not reactive or have catalytic action on the ozone, such as glass or fluororesin (polytetrafluoroethylene), is preferably used for the material of the equipment.

Raw-material oxygen GO that is supplied from line 115 is fed into ozone formation unit 111 in a state resulting from the merger of rare gas (krypton) RG supplied from rare gas feed line 117 and circulating raw material oxygen RO supplied from line 126. A portion of raw material gas GO ozonized by silent discharge in ozone formation unit 111 in the form of an ozonizer and so forth, resulting in the formation of a rare gas-ozone-raw material oxygen mixed gas that is fed into ozone separation unit 112. In the case of using a distillation tower for ozone separation unit 112, the mixed gas is fed into the intermediate stage of the distillation tower after cooling to a predetermined temperature with a heat exchanger. The rare gas-ozone-raw material oxygen mixed gas that has entered the distillation tower is distilled resulting in concentration of oxygen in the upper portion of the tower and concentration of ozone and rare gas in the bottom portion of the tower by a low-temperature distillation separation step in the distillation tower. The oxygen that has been concentrated in the upper portion of the tower becomes circulating raw material oxygen RO which then circulates to the upstream side of ozone formation unit 111 after passing through line 126.

Rare gas-ozone mixed gas OR that has been discharged from ozone separation unit 112 is fed into ozone photodissociation unit 113 in the form of a gas, a specific isotopologue in the ozone is dissociated by light L1, and oxygen is formed according to the aforementioned reaction formulas (1) and (2). The inside of ozone photodissociation unit 113 is made to be at a low temperature and low pressure (for example, 100-250 K and 13 kPa or lower) to ensure that dissociation of a specific ozone isotopologue can be carried out efficiently and in a stable state. The temperature and pressure can be suitably set corresponding to the ozone dissociation status within a range in which there is no liquefaction or solidification of ozone or rare gas.

Since ozone discharged from ozone separation unit 112 is diluted with rare gas, the probability of spontaneous dissociation due to contact with a metal surface having catalytic action is lowered. According to the aforementioned reaction formulas (1) and (2), since the reaction by which three molecules of oxygen are generated from two molecules of ozone is an exothermic reaction, the oxygen molecules formed by dissociation statistically have a large amount of kinetic energy, thereby enabling ozone molecules to break down into oxygen as a result of oxygen molecules colliding with ozone molecules. Since this dissociation of ozone molecules by collision with oxygen molecules occurs non-selectively, although there is a possibility of a desired oxygen isotope being contained in the oxygen resulting from dissociation of ozone molecules, that probability is extremely low, and oxygen containing a desired oxygen isotope resulting from dissociation by irradiation with light L1 ends up being diluted. However, by mixing rare gas into the ozone, since oxygen molecules having a large amount of kinetic energy dissipate their kinetic energy by colliding with rare gas, the probability of ozone molecules being dissociated as a result of oxygen molecules colliding with ozone molecules can be decreased. Consequently, the generation of oxygen not containing a desired oxygen isotope can be suppressed, thereby increasing the concentration rate of the desired oxygen isotope.

The rare gas-ozone-oxygen mixed gas containing oxygen dissociated from ozone in ozone photodissociation unit 113 is separated into oxygen OC1 and rare gas-ozone mixed gas OR1 by a separation procedure such as low-temperature distillation in oxygen isotope concentration unit 114, resulting in a state in which oxygen containing a desired oxygen isotope in oxygen OC1 is concentrated. The rare gas-ozone mixed gas OR separated in oxygen isotope concentration unit 114 is irradiated with light L2 having a wavelength that differs from that of the aforementioned light L1 in second ozone photodissociation unit 121, resulting in dissociation of a desired isotopologue in the ozone into oxygen.

Rare gas-ozone-oxygen mixed gas that has been fed into second oxygen isotope concentration unit 122 from second ozone photodissociation unit 121 is separated into oxygen OC2 in which oxygen containing a desired oxygen isotope has been concentrated, and rare gas-ozone mixed gas OR2 by a separation procedure such as low-temperature distillation in second oxygen isotope concentration unit 122. This rare gas-ozone mixed gas OR2 is subjected to ozone dissociation and decomposition treatment by being fed into ozone decomposition unit 123, resulting in the formation of a rare gas-oxygen mixed gas OR3 composed of oxygen resulting from dissociation of ozone and rare gas, which is then fed into rare gas recovery unit 124.

In rare gas recovery unit 124, an operation is carried out for separating oxygen and rare gas, and waste oxygen WO separated from rare gas-oxygen mixed gas OR3 is discharged outside the system, while the separated rare gas RG is recovered in the aforementioned rare gas feed line 117, and then circulated and fed into raw material oxygen fed from the aforementioned line 115. In addition, since a portion of the rare gas is lost in the separation procedure and so forth, a predetermined amount of rare gas RG is replenished from line 125 so that a fixed amount of rare gas circulates within the system. In this manner, costs can be reduced by recycling the rare gas.

A rare gas feed line 118 similar to the second embodiment shown in the aforementioned FIG. 4 is provided in line 116 for the rare gas-ozone-raw material oxygen mixed gas discharged from ozone formation unit 111, and at least one type of krypton, xenon and argon supplied to ozone photodissociation unit 113 with ozone by ozone separation unit 112 can be fed from this rare gas feed line 118, or at least one type of helium, neon and argon can be fed for improving the operation of ozone separation unit 112. Here, since helium, neon or argon fed from rare gas feed line 118 concentrates on the raw material oxygen side in ozone separation unit 112, and then circulates through line 126 together with circulating raw material oxygen RO, the amounts of these gases that are fed is about equal to the lost amount that is replenished after the amount of rare gas circulating through line 126 has reached a fixed amount.

Figure 6:
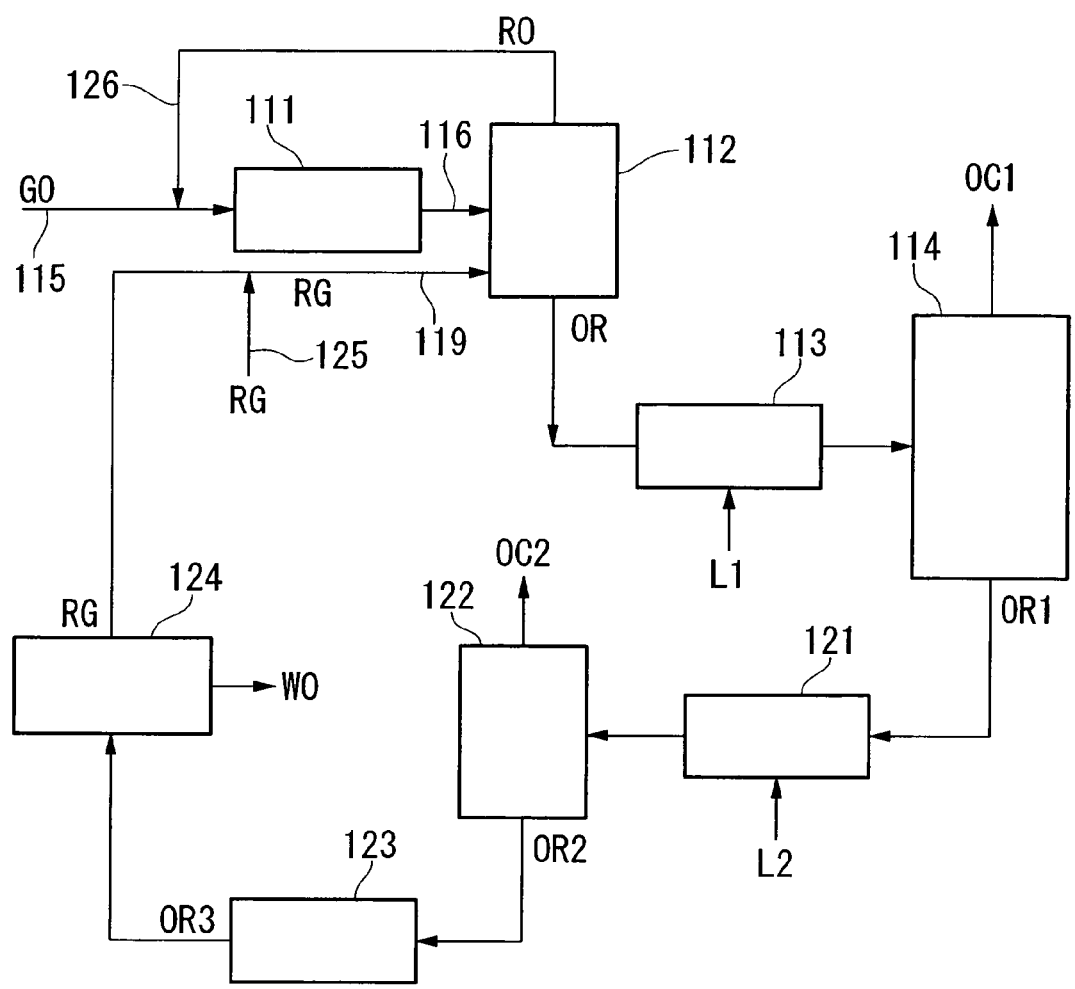
FIG. 6 is a system diagram showing a fourth embodiment of an oxygen isotope concentration device of the present invention.

FIG. 6 is a system diagram showing a fourth embodiment of a concentration device of the present invention. This fourth embodiment mixes ozone by feeding at least one type of rare gas RG selected from krypton, xenon and radon into ozone separation unit 112 from rare gas feed line 119. In this manner, by feeding rare gas on the downstream side from ozone generation unit 111, the conversion of xenon or radon into unstable oxides in ozone formation unit 111 can be prevented. Here, other aspects of the device configuration are the same as those of the aforementioned third embodiment.

Figure 7:
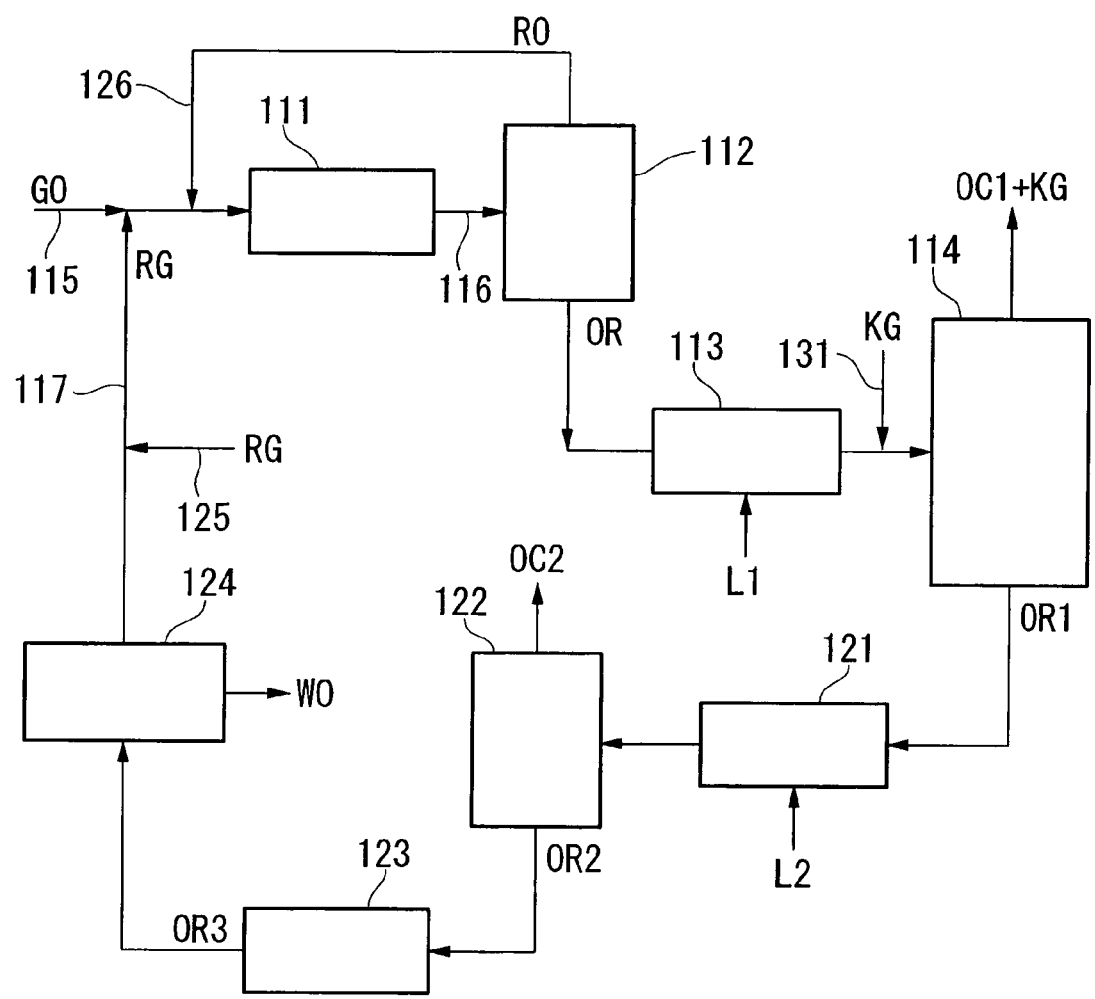
FIG. 7 is a system diagram showing a fifth embodiment of an oxygen isotope concentration device of the present invention.

FIG. 7 is a system diagram showing a fifth embodiment of a concentration device of the present invention. The present embodiment feeds at least one type of rare gas KG selected from helium, neon and argon into a mixed gas containing oxygen formed in ozone photodissociation unit 113, non-dissociated ozone and rare gas from line 131 before feeding into oxygen isotope concentration unit 114. Krypton RG from rare gas feed line 117 is recycled and fed thereinto, as in the third embodiment.

Thus, oxygen generated by dissociation of ozone, non-dissociated ozone, krypton RG circulating within the system, and this rare gas KG composed of at least one type selected from helium, neon and argon can be fed into oxygen isotope concentration unit 114 in a mixed state. At least one type of rare gas KG selected from helium, neon and argon is separated into high boiling point ozone and krypton by a separation procedure such as low-temperature distillation in oxygen isotope concentration unit 114, and discharged with oxygen OC1 having a lower boiling point. Thus, although oxygen containing a specific oxygen isotope is obtained in a state that is diluted with rare gas, since the flow rate can be regulated more easily as compared with a small amount of high-purity oxygen, handling becomes easier. Here, other aspects of the device configuration are the same as those of the aforementioned third embodiment.

Similarly, although not shown in the drawings, line for feeding at least one type of rare gas selected from helium, neon and argon may be provided in a stage before second oxygen isotope concentration unit 122. This is similar to the fourth embodiment shown in FIG. 6.

In the fifth embodiment of the present invention, the peroxide used for the raw material is a substance that has an "O—O" bond its molecule, and is any of the various organic peroxides represented by the chemical formulas shown in Table 3, nitrous ester such as $ONOCH_3$, or nitrate ester such as $O_2NOCH_3$. In Table 3, R and R' respectively represent a hydrogen atom or alkyl group, and R and R' may be the same or different.

TABLE 3

| Chemical Formula | Name |
|---|---|
| ROOH | hydroperoxide |
| ROOR' | (di)alkyl peroxide |
| RC(=O)OOH | peracid, peroxy acid |
| RC(=O)OOC(=O)R' | (di)acyl peroxide |
| RC(=O)OOR' | perester, peroxy ester |
| ROOC(=O)OR' | peroxycarbonate |
| ROC(=O)OOC(=O)OR' | peroxydicarbonate |
| ROOC(=O)OR' | diperoxycarbonate |
| ROOC(=O)—C(=O)OOR' | per(oxy)oxalate |
| —C—C— with O—O below | cyclic peroxide, ozonide, endoperoxide |

The bond dissociation energies of each of the aforementioned compounds are described in Table 4 of The Chemical Record (2nd Edition, Basic Chemistry Edition, The Chemical Society of Japan, published Jun. 20, 1975, p. 978). In Table 4, the values of bond dissociation energies are indicated as the values of those bonds indicated with hyphens "-".

TABLE 4

| Substance | kJ/mol |
|---|---|
| NN—O | 167.0 |
| ON—$OCH_3$ | 152.3 |
| ON—$OC_2H_5$ | 157.7 |
| ON—$OC_3H_7$ | 157.7 |
| $O_2N$—$OCH_3$ | 160.7 |
| $O_2N$—$OC_2H_5$ | 152.3 |
| $O_2N$—$OC_3H_7$ | 156.5 |
| $(CH_3)_3CO$—OH | 163.6 |
| $C_2H_5O$—$OC_2H_5$ | 132.2 |
| $(CH_3)_3CO$—$OC(CH_3)_3$ | 155.0 |
| $CH_3COO$—$OCOCH_3$ | 123.4 |
| $C_2H_5COO$—$OCOC_2H_5$ | 126.0 |
| $C_3H_7COO$—$OCOC_3H_7$ | 126.0 |
| $C_6H_5COO$—$OCOC_6H_5$ | 129.7 |

The values shown in Table 5 are obtained when the bond dissociation energies of the substances shown in Table 4 are converted to the wave number and wavelength of light based on the correlation that 1 J/mol=0.083593462 $cm^{-1}$.

TABLE 5

| Substance | $cm^{-1}$ | μm |
|---|---|---|
| NN—O | 13960 | 0.716 |
| ON—$OCH_3$ | 12731 | 0.785 |
| ON—$OC_2H_5$ | 13183 | 0.759 |
| ON—$OC_3H_7$ | 13183 | 0.759 |
| $O_2N$—$OCH_3$ | 13433 | 0.744 |
| $O_2N$—$OC_2H_5$ | 12731 | 0.785 |

TABLE 5-continued

| Substance | cm$^{-1}$ | μm |
|---|---|---|
| O$_2$N—OC$_3$H$_7$ | 13082 | 0.764 |
| (CH$_3$)$_3$CO—OH | 13676 | 0.731 |
| C$_2$H$_5$O—OC$_2$H$_5$ | 11051 | 0.905 |
| (CH$_3$)$_3$CO—OC(CH$_3$)$_3$ | 12957 | 0.772 |
| CH$_3$COO—OCOCH$_3$ | 10315 | 0.969 |
| C$_2$H$_5$COO—OCOC$_2$H$_5$ | 10533 | 0.949 |
| C$_3$H$_7$COO—OCOC$_3$H$_7$ | 10533 | 0.949 |
| C$_6$H$_5$COO—OCOC$_6$H$_5$ | 10842 | 0.922 |

As can be seen from Table 5, these compounds are able to undergo early dissociation by absorbing light within the range of visible light to near infrared light. Namely, semiconductor lasers that radiate at a wavelength in the visible to near infrared bands can be used as a light source, examples of which include InGaAsP, AlGaInP, GaAsSb, CdZnTe, CdZnSe, AlGaN and InGaN semiconductor lasers.

When focusing on the —COO—O— bond, the wavelength required for dissociation of this bond can be seen to be 0.9-1.0 μm. In particular, peracids and peroxyacids having a —COO—O— bond in their molecules are preferably used in the present invention due to the low toxicity of the raw material, reaction products and so forth, and acetic peracid (CH$_3$COOOH) is particularly preferable. This is because this substance has a —COO—O— bond in its molecule, the optical absorption spectrum contains a vibration mode for the C═O bond, and this substance can be dissociated by irradiating with laser light having a wavelength that matches the vibration mode of C═$^{17}$O or C═$^{18}$O. Since acetic peracid also has a vibration mode for the O—H bond in addition to the vibration mode for the C═O bond, irradiating with laser light at a wavelength that matches the vibration mode of $^{17}$O—H or $^{18}$O—H makes it possible selectively degrade them.

The photodissociation reaction in the case of using a hydroperoxide (ROOH) containing $^{17}$O—H for the peroxide becomes as shown in the following reaction formulas (1a) through (1d). Furthermore, the black dots in each reaction formula represents radicals. In addition, although the example of $^{17}$O is used for the oxygen isotope in the following explanation, the explanation applies similarly to $^{18}$O.

(1a)

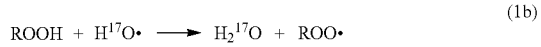

(1b)

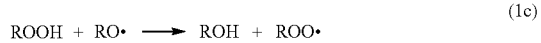

(1c)

(1d)

In reaction formulas (1b) through (1d), since large amounts of radicals "RO•" and "ROO•" are formed, it is preferable to suppress these reactions by diluting the peroxide with solubilizing solvent such as at least one type of solvent selected from carbon tetrachloride, acetone, acetic acid, hexane, toluene and chlorofluorocarbons.

The photodissociation reaction in the case of dialkyl peroxide containing $^{17}$OR' is shown in the following reaction formula (2).

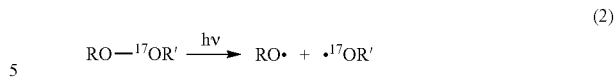

(2)

The photodissociation reaction in the case of peroxy acid containing $^{17}$O—OH is as shown in the following reaction formulas (3a) and (3b).

(3a)

(3b)

The reaction shown in reaction formula (3b) is an exothermic reaction that is considered to have a high reaction probability. In addition, since peracids and peroxy acids are easily dissociated by heat at high, concentrations and spontaneous degrade explosively in certain cases, it is preferable to dilute with a solvent as previously described to suppress radical reactions.

Figure 8:
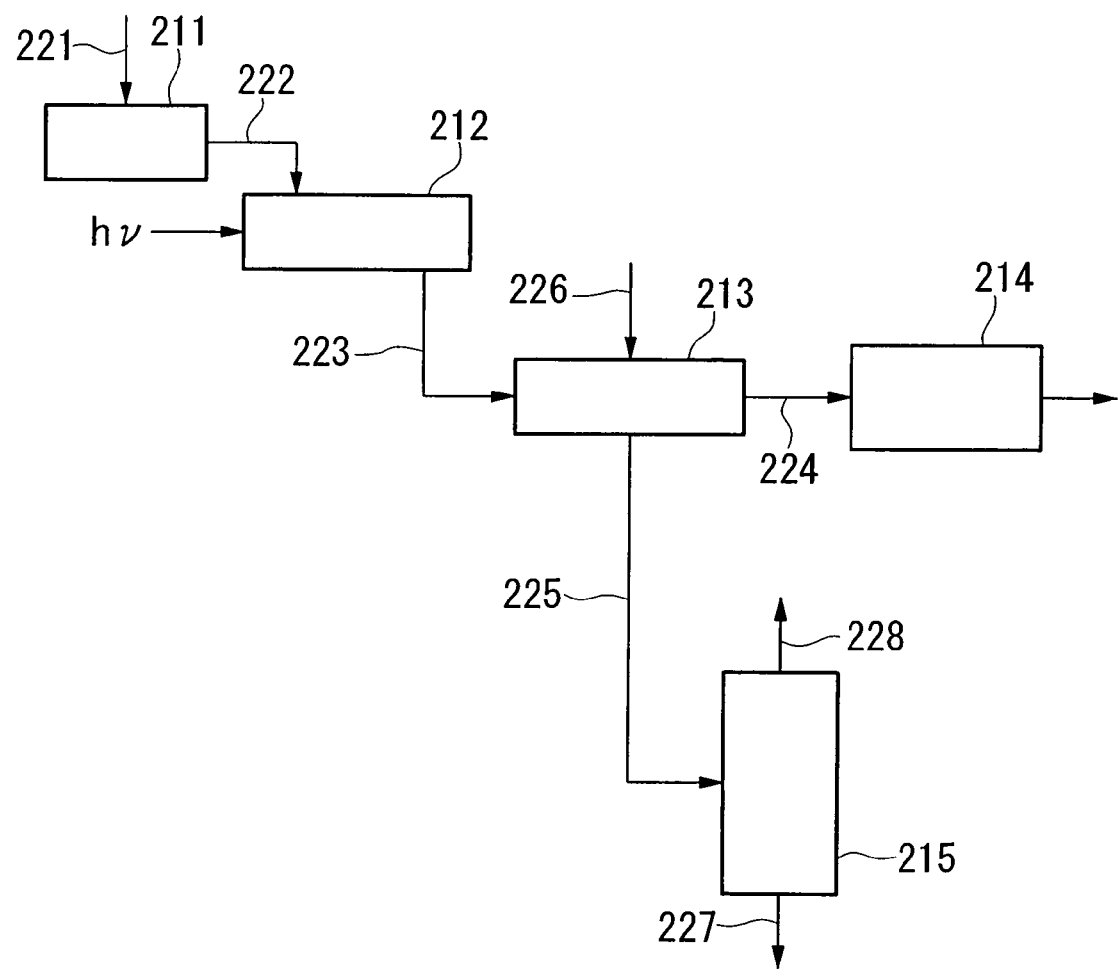
FIG. 8 is a system diagram showing a sixth embodiment of an oxygen isotope concentration device of the present invention.

FIG. 8 is a system diagram showing an example of the configuration of a device for carrying out the oxygen isotope concentration method of the present invention. This oxygen isotope concentration device is provided with a purifier 211, which removes impurities by purifying raw material vapor in which peroxide is diluted with solvent, a photoreaction cell 212, which radiates light of a specific wavelength onto the raw material vapor following purification, a cold trap 213, which captures vapor for which the photodissociation reaction in said photoreaction cell 212 has been completed by condensing or solidifying on a metal surface cooled to a low temperature, a vacuum pump 214 for reducing the pressure inside the aforementioned photoreaction cell 212 to a low pressure such as a pressure of 13 kPa or less, and a distiller 215 for separating each component captured in the aforementioned cold trap 213.

Peroxide serving as the raw material is diluted to a suitable concentration with a solvent followed by vaporization and being fed into purifier 211 from line 221. In this purifier 211, raw material peroxide, from which impurities and water, for example, have been removed, in this purifier 211 is fed into photoreaction cell 212 through line 222. As a result of being irradiated with laser light hv of a specific wavelength in photoreaction cell 212, the peroxide undergoes the reactions of reaction formulas (1b) through (1d) accompanying dissociation of a specific bond in its molecule, for example, the RO—OH bond in hydroperoxide (ROOH) containing $^{17}$O—H as shown in the aforementioned reaction formula (1a). In this reaction, $^{17}$O is concentrated in water molecules.

Vapor containing water molecules in which $^{17}$O is concentrated are fed from photoreaction cell 212 to cold trap 213 through line 223. This cold trap 213 is cooled by a chiller unit and so forth to a temperature (e.g., −20 to −5° C.) that makes it possible for a metal surface to capture the aforementioned water molecules. Since each of the components that condense or solidify at this temperature are captured on the metal surface of the chiller unit, gas such as oxygen that does condense or solidify passes through this cold trap 213 and is discharged from vacuum pump 214 after passing through line 224.

In this stage, path 225 between cold trap 213 and distiller 215 is closed by a valve and so forth.

After a suitable amount of raw material peroxide is allowed to pass through, in addition to stopping vacuum pump 214, lines 223 and 224 in front of and in back of cold trap 213 are closed with valves and so forth, and after opening a valve and so on of line 225, normal temperature nitrogen gas is fed at atmospheric pressure from line 226 into cold trap 213, and in addition to returning the pressure inside cold trap 213 to atmospheric pressure, the temperature is raised to normal temperature resulting in vaporization of each component captured on the metal surface, which then are fed into distiller 215 form line 225. In distiller 215, a distillation procedure is carried out corresponding to the composition of the vapor that has entered, and together with removing water in which $^{17}O$ is concentrated from one of the lines 227, unnecessary components are discharged from the other lines. As a result, water in which $^{17}O$ is concentrated is obtained as the final product.

Even in cases in which $^{17}O$ or $^{18}O$ is concentrated in molecules other than water molecules, by appropriately setting the temperature of cold trap 213 and the operating conditions of distiller 215, a desired substance can be easily extracted as the final product. In addition, a suitable purification unit corresponding to the composition can be employed for the purification method, and a purification method like gas chromatography can be employed.

More specifically, the following indicates the case of concentrating $^{17}O$ in water molecules by dissociating the $(CH_3)_3CO-^{17}OH$ bond in the molecules using $(CH_3)_3COOH$ (tertial-butyl hydroperoxide), which is a type of hydroperoxide ROOH, for the peroxide that contains $^{17}O$. The wavelength of the radiated laser light is 0.731 µm or less from the aforementioned Table 5. Since this wavelength band is the wavelength range that allows the use of an InGaAsP semiconductor laser, by precisely matching to the wavelength capable of dissociating $^{17}O$, a specific $(CH_3)_3COOH$ containing $^{17}O$ can be dissociated according to the photodissociation reaction shown in the aforementioned reaction formula (1a).

In the case of $C_2H_5OOC_2H_5$ (diethyl peroxide), which is a type of dialkyl peroxide ROOR' and in which R and R' are both ethyl groups, by radiating laser light of a wavelength shorter than 0.905 µm that matches the vibration mode of the $O-^{17}O$ bond or $C-^{17}O$ bond using, for example, an InGaAsP or InGaAs semiconductor laser, it can be dissociated as shown in reaction formula (2-1a) while specifying the $C_2H_5OOC_2H_5$ that contains the oxygen isotope $^{17}O$. The radicals formed here form $C_2H_5OH$ and $CH_3CHO$ by going through the reaction process shown in the following reaction formulas (2-1b) through (2-1d), and $^{17}O$ is concentrated in $C_2H_5OH$. The $C_2H_5O\cdot$ in reaction formulas (2-1b) through (2-1d) also includes radicals that contain $^{17}O$.

(2-1a)

(2-1b)

(2-1c)

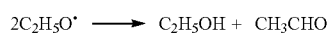
(2-1d)

In the case of $CH_3OOCH_3$ (dimethyl peroxide), in which both R and R' of the dialkylperoxide are methyl groups, $^{17}O$ can be concentrated in $CH_3OH$ according to the following reaction formulas (2-2a) through (2-2c).

(2-2a)

(2-2b)

(2-2c)

In the case of $(CH_3)_3COOC(CH_3)_3$ (dtBP: ditertial butyl peroxide), in which both R and R' of the dialkyl peroxide are t-butyl groups, by using a wavelength shorter than 0.772 µm, which is the wavelength range of an InGaAsP semiconductor laser, that is precisely matched to the vibration mode of the $O-^{17}O$ or $C-^{17}O$ bond, it can be dissociated while specifying dtBP containing the oxygen isotope $^{17}O$ as shown in reaction formula (2-3a).

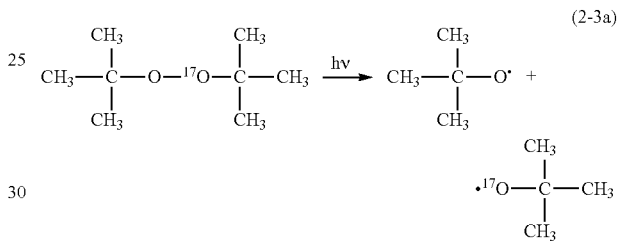
(2-3a)

A list of all the reactions while ignoring intermediate reactions results in the following reaction formulas (2-3b-1), (2-3b-2-1) and (2-3b-2-2), and the $^{17}O$ is concentrated in acetone. Here, (2-3b-1) accounts for about 90% of the product.

(2-3b-1)

(2-3b-2-1)

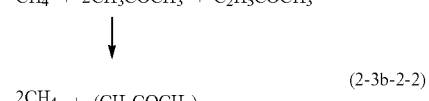
(2-3b-2-2)

t-amyloxy radicals formed in the vapor phase photodissociation of t-amyl ethyl peroxide dissociate in two ways as shown in the following reaction formulas (2-4a) and (2-4b). The methyl radical $CH_3\cdot$ and ethyl radical $C_2H_5\cdot$ formed here are stabilized by bonding with each other. Thus, $^{17}O$ is concentrated in acetone or methyl ethyl ketone.

(2-4a)

(2-4b)

In the case of acetic peracid, in which R is a methyl group in the peroxy acid RCOOOH (and including peracids), by using a wavelength in the visible light band of 0.545-0.660 μm, which is the wavelength range over which an AlGaInP semiconductor laser can be used, that is precisely matched to the vibration mode of the $^{17}$O—H bond, acetic peracid containing the oxygen isotope $^{17}$O can be selectively dissociated according to the reaction formula shown in the aforementioned reaction formula (3a).

Here, a list of all reactions with respect to those reactions when toluene was used as solvent results in the following reaction formula (3c), and the oxygen isotope $^{17}$O is concentrated in molecules of water. However, although $H_2{}^{17}O$ is formed due to an elementary reaction with solvent, the product relating to this solvent is ignored in reaction formula (3c).

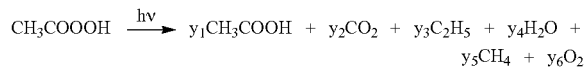

(3c)

In the aforementioned reaction formula (3c), $y_1$, $y_2$, $y_3$ and $y_4$ are about 0.5, 0.4, 0.1 and 0.05, respectively, while $y_5$ and $y_6$ are trace amounts. In addition to the aforementioned toluene, those substances having a double bond such as ethylene can be used as radical capturers.

As has been explained above, according to the present invention, by selecting a photodissociation reaction of ozone or peroxide as a means of separating and concentrating an oxygen isotope, stable isotopes of oxygen in the form of $^{17}$O and $^{18}$O can be concentrated efficiently.

The oxygen isotopes $^{17}$O and $^{18}$O concentrated by the method of the present invention can be used as tracers in the fields of chemistry and medicine.

What is claimed is:

1. An oxygen isotope concentration method comprising:
   (a) an ozone photodissociation step, in which ozone molecules containing oxygen isotopes, $^{17}$O and/or $^{18}$O, are selectively photodissociated to oxygen molecules using a light in the near-infrared range of 700-1000 nm; thereby generating a mixture of the oxygen molecules and non-dissociated ozone molecules; and
   (b) an oxygen isotope concentration step, in which the oxygen molecules are separated from the mixture, thereby concentrating the oxygen isotope.

2. An oxygen isotope concentration method according to claim 1, wherein at least one rare gas selected from krypton, xenon and radon is added in the step (a).

3. An oxygen isotope concentration method according to claim 1, wherein the oxygen isotope concentration step (b) is a distillation carried out by adding at least one rare gas selected from helium, neon and argon.

4. An oxygen isotope concentration method according to claim 1, wherein the wavelength of the light used in the ozone photodissociation step (a) is within the range of 991.965-992.457 nm.

5. An oxygen isotope concentration method according to claim 1, wherein the absorption wavelength of ozone is adjusted by applying an electric field in the ozone photodissociation step (a).

6. An oxygen isotope concentration method according to claim 1, wherein the ozone photodissociation step (a) is carried out at low temperature and at low pressure.

* * * * *